April 14, 1964    T. H. NICHOLL    3,128,951
EMERGENCY SIGNAL LAMP DEVICE
Filed Nov. 7, 1960    3 Sheets-Sheet 1
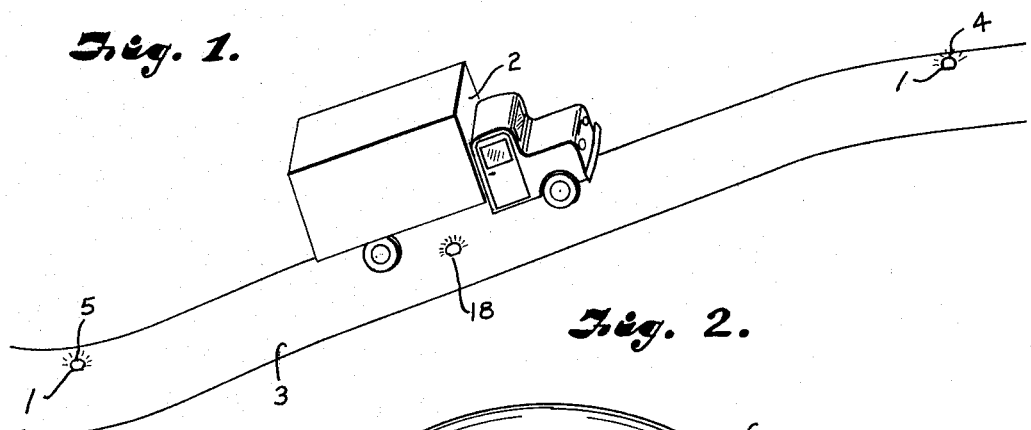
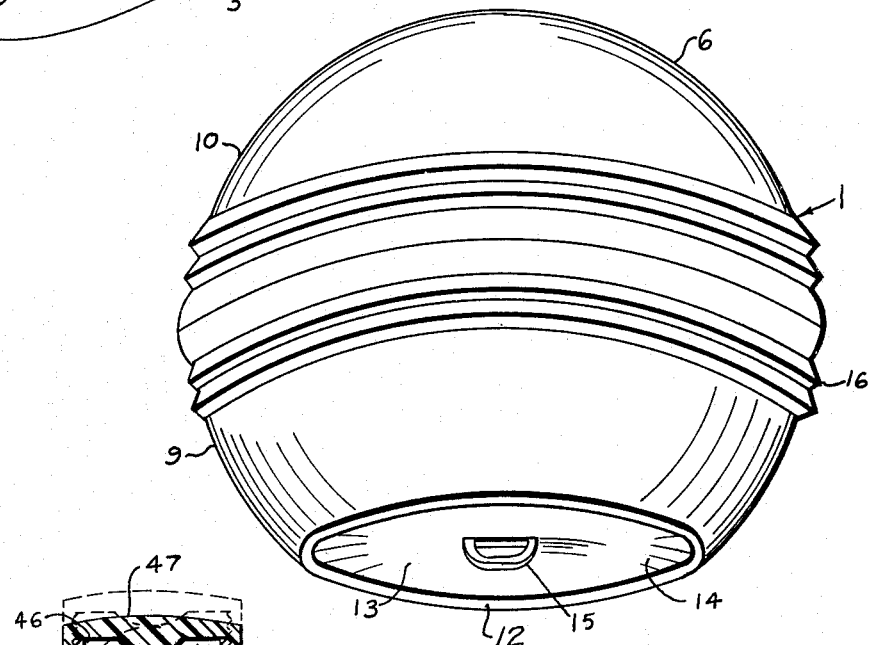
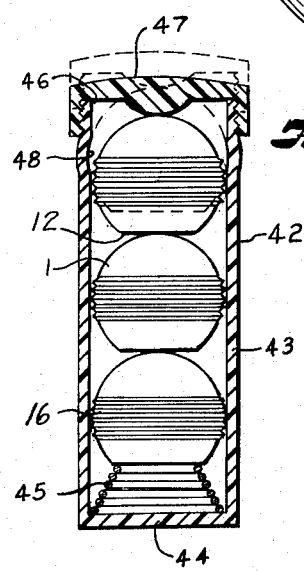
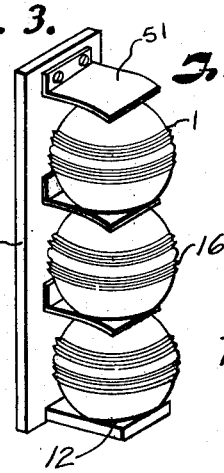
INVENTOR.
THOMAS H. NICHOLL
BY
Fishburn and Gold
ATTORNEYS April 14, 1964   T. H. NICHOLL   3,128,951
EMERGENCY SIGNAL LAMP DEVICE
Filed Nov. 7, 1960   3 Sheets-Sheet 2
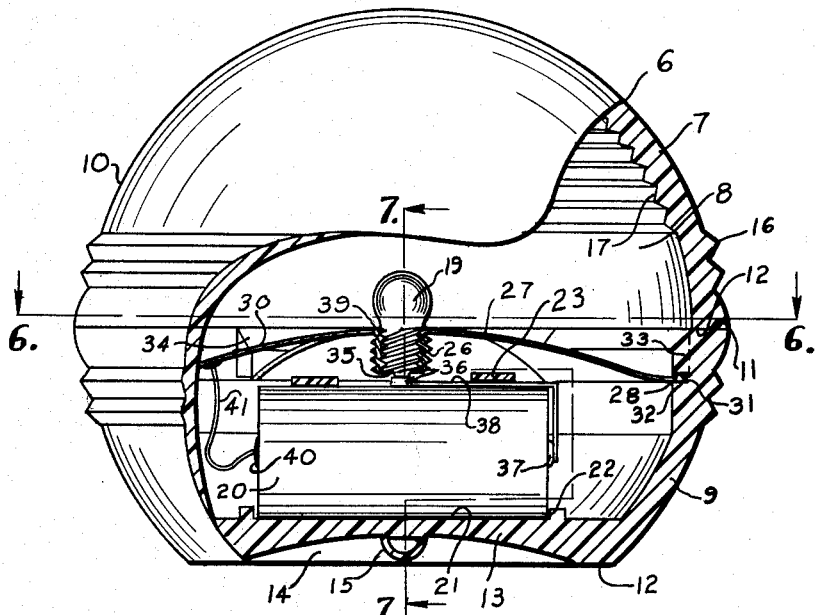
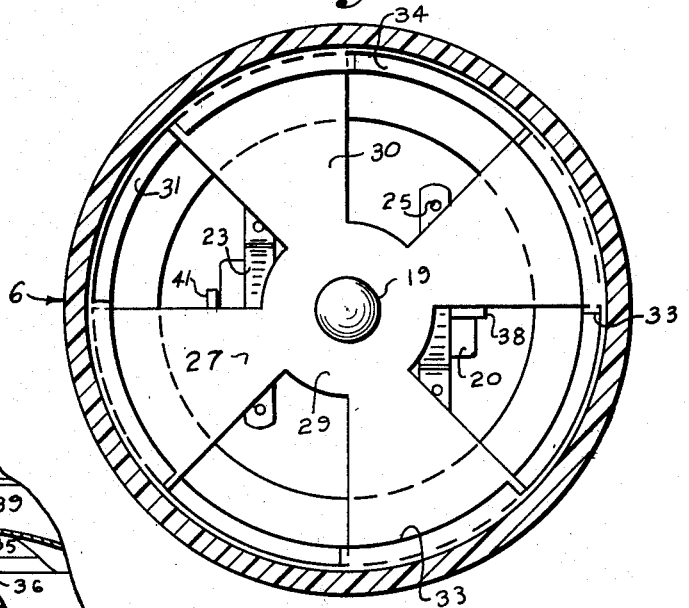
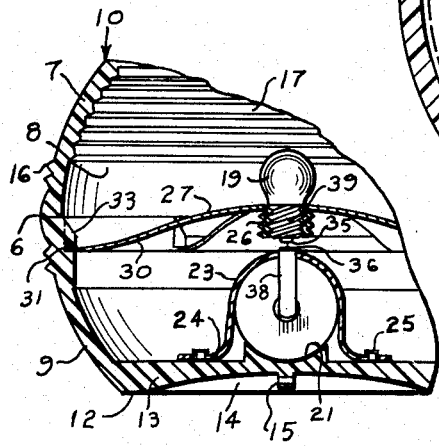
INVENTOR.
THOMAS H. NICHOLL
BY
Fishburn and Gold
ATTORNEYS

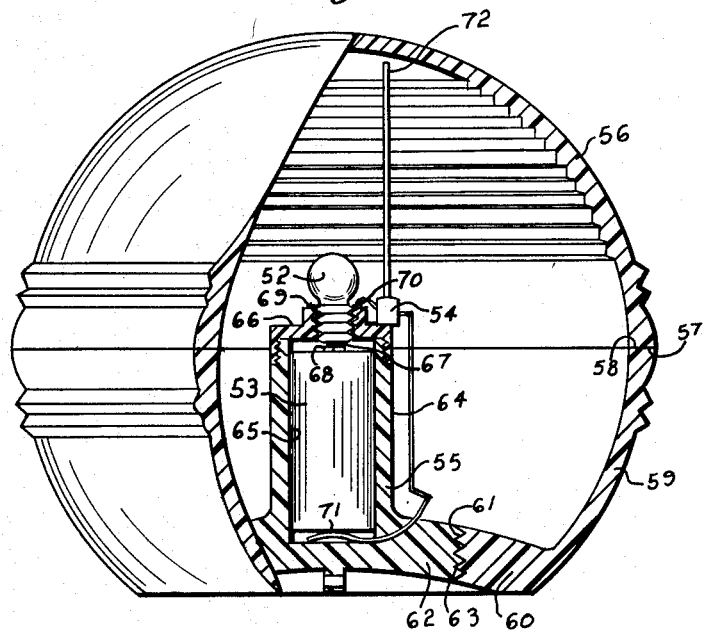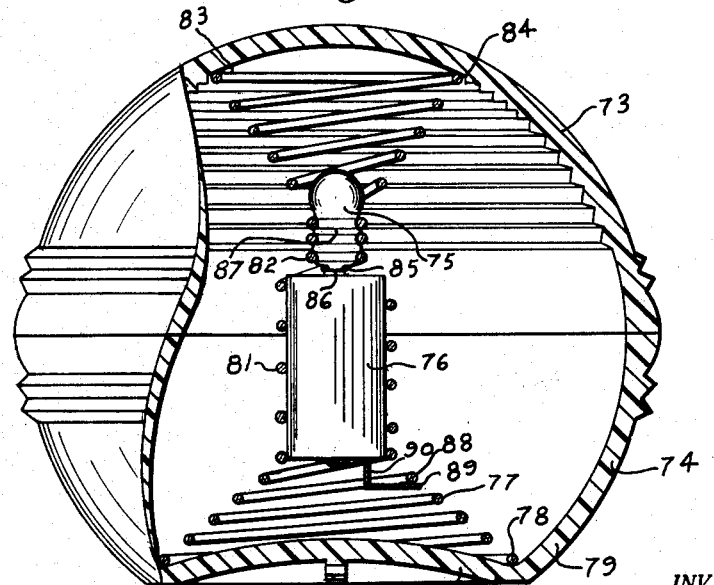

United States Patent Office 3,128,951
Patented Apr. 14, 1964

---

3,128,951
EMERGENCY SIGNAL LAMP DEVICE
Thomas H. Nicholl, 9935 High Drive,
Prairie Village, Kans.
Filed Nov. 7, 1960, Ser. No. 67,599
6 Claims. (Cl. 240—6.4)

This invention relates to an electrically lighted lamp device and more particularly to a marker or signal lamp to indicate position or serve as a warning flare.

Trucks or other vehicles, when stalled on a highway, present a hazard, particularly at night, and it is usually required that the operator proceed immediately to place flares or signal devices at substantial distances along the highway both forwardly and rearwardly of the stalled vehicle. Substantial time is required for the vehicle operator to move the necessary distance to place a signal and return to the vehicle, and then move in the opposite direction to place another signal and, frequently, before the signal flares can be suitably placed, an approaching vehicle may collide with the stalled vehicle.

It is an object of the present invention to provide a signal device that may be thrown or otherwise projected a substantial distance reducing the time required for setting flares and thereby reducing the hazard to approaching vehicles.

Other principal objects of the present invention are to provide a self-contained emergency signal lamp device wherein an electric lamp, source of electric current and circuit are in a hollow body of resilient elastic shock-resistance translucent or transparent material to cushion shocks whereby the structure may be projected for some distance without damage to the device; to provide a self-contained emergency signal lamp device having a hollow body substantially spherical in shape with a flattened bottom that is weighted whereby when positioned on a surface the body will move to rest on said bottom; to provide such a signal lamp device in which the walls of the body define a sealed chamber in which the lamp, battery and circuits are positioned to protect same from corrosion or deterioration from atmospheric conditions and also to provide buoyancy whereby the device will float for use on water; to provide such a signal lamp device in which the body is formed of resilient elastic shock-resistant translucent synthetic resin whereby light emitted from the electric bulb is transmitted through the walls of the body; to provide such a signal lamp device in which the walls are deformable inwardly and contacts of an electric circuit from the battery to the bulb are supported in circuit-completing position in static condition of the walls of the body and are moved to circuit-interrupting position in response to inward deformation of portions of the walls of the body whereby the device may be stored with the walls deformed to maintain the circuit interrupted until time for use and when removed from the place of storage and outside pressure released from the walls the circuit is automatically completed for energization of the electric bulb to provide the signal light; to provide such a self-contained emergency signal lamp device that may be conveniently stored in an accessible location, removed and placed in a desired location or thrown or otherwise projected a substantial distance with the energization of the light source being automatically activated for operation to form a marker or warning when the device comes to rest; to provide a signal device that is adapted for use with safety in explosive or inflammable atmospheres or areas; and to provide a self-contained emergency signal lamp device that is economical to manufacture, durable, reliable and efficient in operation, and usable in water or on land.

Other objects and advantages of this invention will become apparent from the following description taken in connection with the accompanying drawings wherein are set forth by way of illustration and example certain embodiments of this invention.

FIG. 1 is a perspective view illustrating the use of a signal device embodying the features of the present invention as a warning flare relative to a stalled vehicle.

FIG. 2 is a perspective view of a signal device embodying the features of the present invention.

FIG. 3 is a sectional view through a container of a plurality of signal devices.

FIG. 4 is a perspective view of a storage bracket with signal devices therein.

FIG. 5 is a side elevation of the signal device with portions broken away to show the arrangement of the battery, circuit, light bulb and supporting structure therefor.

FIG. 6 is a horizontal sectional view through the signal device taken on the line 6—6, FIG. 5.

FIG. 7 is a partial vertical sectional view through the signal device generally taken on the line 7—7, FIG. 5.

FIG. 8 is a side elevational view of a modified form of signal device with portions broken away to illustrate the structure thereof.

FIG. 9 is a side elevational view of a further modified form of signal device with portions broken away to illustrate the structure thereof.

Referring more in detail to the drawings:

In the drawings where, for the purpose of illustration, are shown examples of the invention, the numeral 1 designates a self-contained emergency signal lamp device adapted to be used as a marker or signal as, for example, alongside of a stalled vehicle 2 on a highway 3 and forwardly and rearwardly of the vehicle as illustrated at 4 and 5 respectively, as illustrated in FIG. 1. The signal lamp device 1 preferably consists of a body 6 having walls 7 forming a shell or casing defining a closed chamber 8. In the illustrated structure, the body member includes a lower shell section 9 and an upper shell section 10 arranged with abutting faces 11 and 12 respectively suitably joined together as by suitable adhesives, heat sealing and the like to form a watertight joint. The body is preferably substantially spherical or ball-like in shape weighted to be self righting. In the illustrated structure, the lower section has a flattened portion defining bottom surfaces 12 lying in a plane normal to a radius of the body whereby said body is generally a spherical segment of one base and said surface is adapted to engage a supporting member for the signal device to rest thereon. The lower section 9 has a bottom wall 13 which is preferably provided with a concavity 14 extending upwardly therein from the surface 12 whereby said surface 12 is in the form of a ring. An eye member 15 is arranged on the bottom wall 13 within the cavity 14 for securing the body to a suitable anchor or fastening means, if desired.

The body member preferably has walls of resilient elastic shock-resistant translucent or transparent material, as for example, synthetic resin such as polyethylene, polyvinyl chloride, or other resilient flexible material. It is preferred that both the upper and lower sections be made of translucent or transparent material for transmission of light therethrough, and particularly the upper section, to serve as lens elements for the transmission of light therethrough. Also, ribs 16 may be arranged on the exterior of the walls and ribs 17 may be arranged on the interior of the walls of the sections or said walls arranged with suitable directing or diffusing elements whereby light originating from the interior of the chamber 8 will be visible in certain or all directions above the surface on which the device rests. Also, the lens portions of the body preferably will have suitable colors to provide the desired color of the light transmitted therethrough as, for example, the color red for signals to be placed as at 4 and 5 in FIG. 1 and white for a signal to be placed as at 18 in FIG. 1. The walls of the body preferably have the ribs thereon or portions arranged or coated to provide reflectors of light or have fluorescent coating to glow in the dark. It is preferred that the chamber 8 be airtight whereby the device is buoyant in the event it is placed in water and, also, it is preferred that a suitable gas pressure be placed in the chamber to assure the walls returning to their normal spherical shape in the event they are deformed inwardly in any portion from external pressure. The gas used for such pressure as, for example, 2 pounds per square inch, is preferably inert and dry to thereby tend to reduce or eliminate corrosion on any parts in the chamber as, for example, the gas may be carbon dioxide or nitrogen or other suitable gas.

A suitable electric lamp 19 is arranged in the chamber 8 preferably near the axial center of the body and adapted to be connected in electrical circuit with a suitable source of electric energy such as a battery 20 or the like, the battery preferably being supported adjacent the bottom wall 13 to provide weight whereby the center of gravity of the device is below the spherical center to assure the body of being positioned upright when it comes to rest on land or in water. In the structure illustrated in FIGS. 5 to 7 inclusive, the battery 20 rests in a recess or saddle forming portion 21 extending upwardly from the bottom wall 13, and suitable fastening devices retain the battery in place. The ends of the recess or saddle have upstanding flanges or lugs 22 to limit endwise movement of the battery 20, and flexible straps 23 extend over the battery and have end portions 24 connected to suitable fasteners 25 mounted on the bottom 13, as illustrated in FIGS. 5 and 7. The bulb 19 is suitably secured in a socket 26 preferably carried by a spider 27 formed of resilient or spring material such as spring metal having outer edge or marginal portions 28 secured to the walls of the body member 6. In the illustrated structure, the spider 27 has a center portion 29 carrying the socket 26 and outwardly extending arms 30, and the wall of the lower section has a slot 31 extending therearound in downwardly spaced relation to the surface 11, said slot or recess 31 forming a shoulder 32 on which the arms rest and portions of the wall extending inwardly above the arms to form spaced lugs 33 adapted to engage the upper portion of the arms. The lugs 33 have spaces 34 therebetween whereby the spider may be arranged with the arms moving through the spaces 34 to rest on the shoulder 32 and the spider then rotated to position the outer marginal portions of the arms under the lugs 33. The spider preferably is of open structure to reduce obstruction to the light and may also be coated with reflective material to increase intensity of emitted light. The spider is formed in a dish or dome shape and the spring action thereof arranged whereby it is biased to urge the lamp 19 in a direction to urge the center terminal 35 into contact with a contact or terminal 36 electrically connected in circuit with one terminal 37 of the battery as by a conductor strip 38. In the illustrated structure, the strip 38 is soldered or otherwise secured to the terminal 37 of the battery 20 and extends upwardly and over the battery, terminating in the contact 36 below the light bulb 19. The other terminal 39 of the light bulb is electrically connected in circuit with the other terminal 40 of the battery. In the illustrated structure, the socket 26 and the spider 27 are of electrical conducting metal, and the spider is connected to a conductor 41 and which is soldered or otherwise secured to said other terminal 40 of the battery. With this arrangement, the normal biasing of the spider 27 and static position of the walls of the body member is such that electric circuit is normally completed between the battery 20 and the bulb 19. However, inward pressure on the sides of the body member as, for example, along the ribs 16 will cause the spider to tend to bow upwardly separating the movable contacts or terminals 35 and 36 interrupting the circuit from the battery to the bulb.

Signal devices constructed and assembled as described may be placed in a suitable container 42 such as a cylindrical tube having walls 43 with a closed end 44, the walls 43 defining an interior of less diameter than the diameter of the body of the signal devices whereby when the signal devices are moved into the interior of the container the sides are deformed inwardly to interrupt the circuit from the battery to the light bulb 19. It is preferred that the container have a spring 45 adjacent the closed end to urge the signal devices out the open end 46 of the container. It is preferred that the open end have a removable transparent cover 47 which, when in container closing position for storage, will retain the signal devices in the position as illustrated in FIG. 3. It is also preferred that such a container have an enlarged portion 48 whereby the closure or cover may be partially removed to allow the outermost signal device to move into the enlarged portion which permits the body member 6 to expand outwardly to its static position, completing the circuit from the battery to the bulb whereby light would be emitted through the cover 47 from the outermost signal devices and the inner signal devices still being in de-energized condition.

In using a signal device constructed and assembled as described for a warning signal as, for example, along a highway, the cover 47 of the container 42 would be removed and the signal devices taken from the container. Immediately upon release of pressure on the walls of the body member, said walls would move from their inwardly deformed position outwardly to the static position whereby the spider 27 would bias the contacts 35 and 36 together to complete the circuit from the battery 20 to the bulb 19, energizing the bulb and providing a light thereby that is transmitted through the walls of the body or lens elements thereof. The signal device may then be thrown or otherwise suitably propelled in a direction in which it is desired to locate the marker and, upon striking the ground or the like, the resiliency of the walls of the body member being impact-resistant would stand the shock and also cushion same and the resiliency of the mounting of the bulb would reduce shock thereto whereby the signal light would continue to operate. In the event the body member landed on the spherical portion thereof, it could roll, but in the rolling movement the weight adjacent the bottom would gradually tip the device whereby the bottom would turn downwardly and the device would come to rest on the bottom and be positioned in upright position providing a warning signal. Another device could be projected in the same manner in the opposite direction, and a third signal device could be arranged alongside of the vehicle, as illustrated in FIG. 1. The structure is such that it is buoyant and watertight whereby if it landed in water it would tend to float in an upright position and still provide the signal. Also, it could be secured by a suitable line or the like connected to the eye 15 to other devices whereby it could serve as a marker or buoy for use on water. While the structure illustrated in FIGS. 5 and 6 inclusive are particularly arranged for deformation of the wall portions adjacent the ends of the arms 30 inwardly to interrupt the circuit, the spider may be arranged with its biasing relative to the contacts whereby deformation between the top and the bottom would provide the interruption of the circuit. Also, the signal device may be suitably stored in other structures for convenient access with members to provide such deformation as, for example, on a bracket 50 or other holder having spaced outwardly extending arms 51 between which the signal devices may be inserted, the spacing between the arms 51 being such that when the devices 1 were arranged therebetween the walls of the body member would be suitably deformed inwardly to interrupt the circuit from the battery 20 to the bulb 19.

In the form of the invention illustrated in FIG. 8, the bulb 52, battery 53 and electrical circuit including a switch 54 are carried on a removable portion 55. The upper section 56 of the body is preferably of substantially the same construction as the upper portion 7 of the body of the device illustrated in FIGS. 5 to 7 inclusive, and the lower surface of said top section is suitably secured to the upper surface 58 of the lower section 59 as by adhesive, welding or the like, with the walls of both the upper and lower sections being of impact-resistant resilient translucent or transparent material as, for example, synthetic resin. The bottom wall 60 has an opening 61 through which the removable portion mounting member 55 is inserted, and the mounting member suitably secured to said bottom wall. In the illustrated structure, the mounting member has an enlarged portion 62 which is threaded into an internally threaded bore 63 of the opening 61. The mounting member 55 has an upstanding wall 64 defining a socket 65 for receiving a battery 53 therein. The upper end of the socket 65 is closed by a closure member 66 which is suitably secured to the wall 64 and the light bulb 52 is carried by said closure member and arranged whereby the center terminal 67 of said bulb is electrically connected to a terminal 68 of the battery 53. The other terminal 69 of the bulb is connected by a conductor 70 to the other terminal 71 of the battery with the switch 54 arranged in the conductor, said switch may be of a push-on, push-off type, twist type or other suitable type. In the structure illustrated, the switch is of a conventional type wherein the contacts are normally biased into circuit-making position and moved by a plunger or actuator member 72 into circuit-interrupting position. In the illustrated structure, the actuator member 72 is in the form of a rod or the like that extends upwardly from the switch 54 and is arranged whereby downward movement of the rod toward the bottom of the device will effect interrupting of the circuit and release of pressure will permit the switch to return, moving the rod upwardly to complete the circuit from the battery to the light bulb. In this structure, deformation of the body member to move the upper portion thereof above the rod 72 inwardly, thereby shortening the distance between the bottom and said upper portion of the wall, will cause the wall to engage the rod 72 and move the switch to a circuit-interrupting position. Release of the pressure will permit the wall to return to its static position as illustrated in FIG. 8 whereby the switch is in circuit-making position.

The use of a structure constructed and assembled as illustrated and described in FIG. 8 will be substantially as described relative to the structure illustrated in FIGS. 5 to 7 inclusive. In the event the battery 53 in the structure illustrated in FIG. 8 should become ineffective or exhausted, the mounting member 55 may be unscrewed from the body member whereby the battery, bulb and switch are accessible, and the bulb may be replaced if necessary and the closure 66 removed and the battery replaced, the parts reassembled and the holder returned to its position in the body member whereby the device would again be ready for use.

In the structure of the invention illustrated in FIG. 9, the body member including the upper section 73 and lower section 74 are preferably of substantially the same structure as illustrated and described relative to the body member disclosed in FIGS. 5 to 7 inclusive except for the mounting of the battery and the spider thereof. In the structure illustrated in FIG. 9, the bulb 75 and battery 76 are arranged in a resilient mounting provided by a spring 77 which is wound from a single piece of wire wherein the lower portion of the spring has a large convolution 78 adapted to engage the lower body member substantially at the intersection of the spherical portion 79 of the wall with the bottom wall 80. The spring 77 has its convolutions progressively smaller whereby they converge inwardly and upwardly in a substantially conical shape to approximately the lower portion of the battery 76, and then said spring has the convolutions thereof wound to define a substantially cylindrical shape as at 81 to engage the sides of the battery 76. Above the battery, the wire of the spring is wound on a spiral as at 82 of suitable size to form a socket for the bulb 75, and thereabove the spring is generally an inverted cone shape, the convolutions being progressively larger and terminating in an end convolution 83 engaging the upper portion of the body member in a recess defined by an inwardly extending ring member 84. In this arrangement, the center terminal 85 of the bulb is preferably fixed as by soldering to a center terminal 86 of the battery 76. The wire of the spring engaging the bulb at the socket end forms a contact with the other terminal 87 of the bulb and a conductor to complete the circuit to the battery when a convolution 88 of said spring engages a finger 89 of a contact 90 that has one end suitably secured as by soldering to the other terminal or bottom of the battery with the finger extending therefrom between convolutions of the spring, as illustrated in FIG. 9. The spring is biased in such a manner that when the walls of the body member are in expanded or static position the convolution 88 will engage the contact 90 in circuit-making position whereby the bulb 75 is energized by the battery 76, and when the walls of the body member are deformed inwardly the contact 90 is separated from the convolution 88 to interrupt the circuit. The spring may be biased whereby the circuit-interrupting deformation of the body member may be such as to shorten the height from the bottom to the upper portion of the body member, or it may be to deform the side portions inwardly. However, in the structure illustrated, the circuit is interrupted from pressure from the bottom and the top of the body member at the ends of the spring to deform the body walls inwardly.

In use of a structure constructed and assembled as described, the signal device may be removed from its place of storage and thrown or otherwise projected in a direction in which it is desired that the marker be located, the body member and mounting for the bulb being such that impact and shock is absorbed whereby when the device comes to rest the bulb will be energized to provide the warning signal.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A self-contained emergency signal lamp device comprising, a hollow body substantially in the shape of a spherical segment of one base with said base being a flattened bottom having bottom supporting portions in a plane normal to a radius of the body and of an area whereby said body when positioned on said bottom portions will tend to remain at rest, said body having walls of resilient elastic shock-resistant light transmitting material defining a chamber within said body with said walls deformable inwardly from static positions by exterior pressure, a battery within said chamber, an electric bulb positioned within said chamber for emitting light when energized for transmission through walls including an upper portion of the body, said battery having terminals, a contact electrically connected to one of the battery terminals, said light bulb being electrically connected to the other of the battery terminals, and resilient conductor means engaging opposed portions of the walls of the body and supporting the light bulb with said resilient conductor means normally biased to complete the circuit between the contact and the light bulb when the walls of the body are in static position, said resilient conductor means being movable in response to deformation of said opposed portions of the body and operable to interrupt the circuit between the contact and light bulb in response to inward deformation of portions of the walls of said body.

2. A self-contained emergency signal lamp device comprising, a hollow body substantially in the shape of a spherical segment of one base with said base being a flattened bottom having bottom supporting portions in a plane normal to a radius of the body and of an area whereby said body when positioned on said bottom portions will tend to remain at rest, said body having walls of resilient elastic shock-resistant material defining a chamber within said body with said walls deformable inwardly from static positions by exterior pressure, said body walls having light transmitting portions for passage of light therethrough, a battery within said chamber and having terminals, resilient conductor means engaging said battery in electrically insulated relation to said battery terminals and supporting said battery adjacent the bottom of the body whereby the center of gravity of the device is below the center of the spherical body, an electric bulb having terminals and positioned within said chamber for emitting light when energized for transmission through translucent wall portions, and a contact electrically connected to one of the battery terminals, one terminal of the light bulb being electrically connected to the other of the battery terminals, said resilient conductor means engaging opposed portions of the walls of the body and supporting the light bulb in electrical contact with the other terminal thereof with said resilient conductor means normally biased to complete the circuit between the contact and the light bulb when the walls of the body are in static position, said resilient conductor means being movable in response to deformation of said opposed portions of the walls of the body and operable to interrupt the circuit between the contact and light bulb in response to inward deformation of portions of the walls of said body.

3. A self-contained emergency signal lamp device comprising, a hollow body substantially in the shape of a spherical segment of one base with said base being a flattened bottom having bottom supporting portions in a plane normal to a radius of the body and of an area whereby said body when positioned on said bottom portions will tend to remain at rest, said body having walls of resilient elastic shock-resistant light transmitting material defining a chamber within said body with said walls deformable inwardly from static positions by exterior pressure, a battery within said chamber adjacent the bottom of the body whereby the center of gravity of the device is below the center of the spherical body, an electric bulb positioned within said chamber for emitting light when energized for transmission through walls including the upper portion of the body, said battery having terminals, a contact electrically connected to one of the battery terminals, said light bulb being electrically connected to the other of the battery terminals, and resilient conductor means engaging opposed portions of the walls of the body and supporting the light bulb with said resilient conductor means normally biased to complete the circuit between the contact and the light bulb when the walls of the body are in static position, said resilient conductor means being movable in response to deformation of said opposed portions of the walls of the body and operable to interrupt the circuit between the contact and light bulb in response to inward deformation of portions of the walls of said body whereby maintaining the walls of the body deformed inwardly interrupts the circuit to the light bulb and release of the body for return of the walls to static position completes the circuit to the light bulb for energizing same.

4. A signal lamp device of claim 3 in which the outer surface of the bottom portion is concave inwardly toward the center of the body and an eye member secured to said bottom and positioned in the concavity thereof.

5. A self-contained emergency signal lamp device comprising, a substantially spherical hollow body, said body having walls of resilient elastic shock-resistant light transmitting material defining a chamber within said body with said walls deformable inwardly from static positions by exterior pressure, a battery within said chamber adjacent a bottom of the body whereby the center of gravity of the device is below the center of the spherical body, an electric bulb positioned within said chamber for emitting light when energized for transmission through walls of the body, said battery having terminals, a contact electrically connected to one of the battery terminals, means electrically connecting the light bulb to the other of the battery terminals, and resilient conductor means engaging opposed portions of the walls of the body and supporting the light bulb with said resilient conductor means normally biased to complete the circuit between the contact and the light bulb when the walls of the body are in static position, said resilient conductor means being movable in response to deformation of said opposed portions of said body to separate said circuit between the contact and bulb and interrupt the circuit between the battery and the light bulb.

6. A self-contained emergency signal lamp device comprising, a substantially spherical hollow body, said body being formed of resilient elastic shock-resistant light transmitting material whereby portions are deformable inwardly from static positions by exterior pressure, an electric bulb within said hollow body and positioned to emit light when energized for transmission through portions of said body, a battery within said body in offset relation to the center of the spherical hollow body to provide an offset center of gravity of the device whereby said hollow body tends to move to rest with said battery at the bottom, an electric circuit including the battery and bulb and having a resilient conductor engaged with opposed portions of the body and supporting the battery and bulb in electrical contact of one terminal of each, said resilient conductor being movable in response to deformation of the body at said opposed portions, said conductor having electrical contact with the other terminal of the bulb, and a contact means electrically engaging the other terminal of the battery and normally electrically engaging said resilient conductor whereby inward deformation of said opposed portions separates said contact and resilient conductor and interrupts the circuit to the electric bulb.

References Cited in the file of this patent

UNITED STATES PATENTS

| | | |
|---|---|---|
| 935,717 | Williams | Oct. 5, 1909 |
| 1,110,100 | Ambash | Sept. 8, 1914 |
| 1,292,790 | Jackson | Jan. 28, 1919 |
| 1,440,268 | Banaszak | Dec. 26, 1922 |
| 1,555,902 | Brady | Oct. 6, 1925 |
| 2,088,201 | Goertzen | July 27, 1937 |
| 2,121,114 | Beck | June 21, 1938 |
| 2,222,303 | Shough | Nov. 19, 1940 |
| 2,383,390 | Jacobs | Aug. 21, 1945 |
| 2,611,214 | Shur | Sept. 23, 1952 |
| 2,639,106 | Sesera | May 19, 1953 |
| 2,654,022 | Amamy et al. | Sept. 29, 1953 |
| 2,849,819 | Murphy | Sept. 2, 1958 |
| 2,903,820 | Bodell | Sept. 15, 1959 |
| 2,949,531 | Lemelson | Aug. 16, 1960 |
| 3,011,048 | O'Brien | Nov. 28, 1961 |

FOREIGN PATENTS

| | | |
|---|---|---|
| 431,310 | Great Britain | July 4, 1935 |